United States Patent
Suda et al.

(10) Patent No.: US 7,313,420 B2
(45) Date of Patent: Dec. 25, 2007

(54) MOBILE TERMINAL, CONTROL DEVICE, COMMUNICATION SYSTEM AND COMMUNICATION METHOD WITH MULTISTATE RECEPTION CONTROL

(75) Inventors: Hirohito Suda, Yokosuka (JP); Yukihiko Okumura, Yokohama (JP); Masato Maeda, Yokohama (JP); Shigeru Tomisato, Okayama (JP)

(73) Assignee: NTT DoCoMo, Inc., Tokyo (JP)

( * ) Notice: Subject to any disclaimer, the term of this patent is extended or adjusted under 35 U.S.C. 154(b) by 263 days.

(21) Appl. No.: 10/654,961

(22) Filed: Sep. 5, 2003

(65) Prior Publication Data

US 2004/0102159 A1     May 27, 2004

(30) Foreign Application Priority Data

Sep. 5, 2002     (JP) ............................. 2002-260523

(51) Int. Cl.
*H04B 1/38* (2006.01)
(52) U.S. Cl. .................. 455/574; 455/753; 455/522
(58) Field of Classification Search .............. 455/574, 455/572, 343.1, 343.2, 456.6, 524
See application file for complete search history.

(56) References Cited

U.S. PATENT DOCUMENTS

| | | | |
|---|---|---|---|
| 5,606,741 A | | 2/1997 | Yamamoto |
| 5,799,256 A | * | 8/1998 | Pombo et al. ............. 455/574 |
| 5,953,677 A | * | 9/1999 | Sato ........................ 455/574 |
| 6,263,200 B1 | * | 7/2001 | Fujimoto ................. 455/343.5 |
| 6,324,397 B1 | | 11/2001 | Adachi et al. |
| 6,385,469 B1 | * | 5/2002 | Alperovich et al. ........ 455/574 |
| 6,876,863 B1 | * | 4/2005 | Schroeder et al. .......... 455/466 |

FOREIGN PATENT DOCUMENTS

| | | |
|---|---|---|
| JP | 9-261153 | 10/1997 |
| JP | 2000-101508 | 4/2000 |
| JP | 2001-285911 | 10/2001 |

* cited by examiner

*Primary Examiner*—Lester G. Kincaid
*Assistant Examiner*—Fred Casca
(74) *Attorney, Agent, or Firm*—Oblon, Spivak, McClelland, Maier & Neustadt, P.C.

(57) ABSTRACT

A mobile terminal comprises a transmitter/receiver configured to transmit/receive a signal to/from a base station, a communication state determination unit configured to determine a communication state of the transmitter/receiver, a movement state measurement unit configured to measure a movement state of the mobile terminal, and a reception period controller configured to control a reception period for receiving a control signal transmitted from the base station by the transmitter/receiver, based on a communication state determination result determined by the communication state determination unit and a movement state measurement result measured by the movement state measurement unit.

8 Claims, 7 Drawing Sheets

BACKGROUND ART

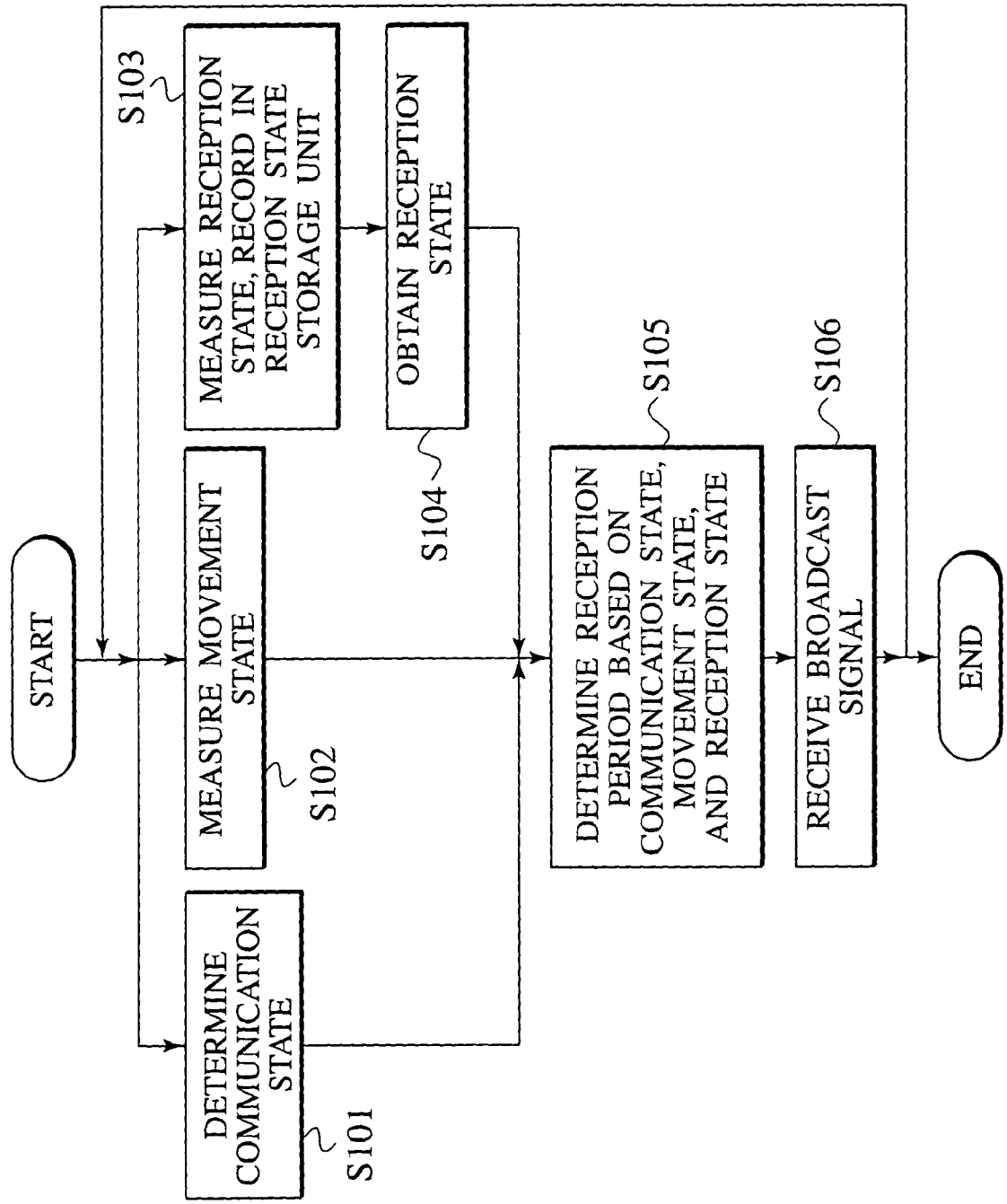

MOBILE TERMINAL, CONTROL DEVICE, COMMUNICATION SYSTEM AND COMMUNICATION METHOD WITH MULTISTATE RECEPTION CONTROL

CROSS REFERENCE TO RELATED APPLICATIONS

This application is based upon and claims the benefit of priority from the prior Japanese Patent Application No. P2002-260523, filed on Sep. 5, 2002; the entire contents of which are incorporated herein by reference.

BACKGROUND OF THE INVENTION

1. Field of the Invention

The present invention relates to a mobile terminal, a control device, a communication system, and a communication method.

2. Description of the Related Art

There has been demand for mobile terminals with long continuous communication periods and continuous stand-by periods. However, since a mobile terminal moves between cells covered by a plurality of base stations, the mobile terminal must find and connect to a base station that covers the cell in which the mobile terminal exists. The mobile terminal must receive a broadcast signal from a base station in order to find the base station. As a result, the mobile terminal exhausts its battery, and the continuous stand-by period becomes shorter. Consequently, a mobile terminal has been proposed, which reduces power consumption and lengthens the continuous stand-by period by decreasing the number of times of receiving broadcast signals according to the assumption that there is little need to find a base station, since the same base station continues to connect and serve stationary mobile terminal.

For example, a mobile terminal 30 as shown in FIG. 1, which utilizes the fact that the speed of variation in phasing caused by movement of a mobile terminal varies depending on the mobile terminal movement speed, has been proposed. A broadcast signal receiver 31 receives broadcast signals from base stations. The mobile terminal 30 obtains base station information from the received broadcast signals. A reception period determination unit 32 measures a maximum Doppler frequency based on the reception signal received by the broadcast signal receiver 31. If the maximum Doppler frequency is high, the reception period determination unit 32 then determines that the movement speed is fast, and shortens the period for receiving the broadcast signals. Meanwhile, if the maximum Doppler frequency is low, the reception period determination unit 32 determines that the movement speed is slow, and lengthens the period for receiving the broadcast signals.

In addition, a mobile terminal 40 as shown in FIG. 2, which uses a vibration sensor so as to measure mobile terminal movement state, has been proposed (Japanese Patent Laid-Open No. 2000-101508). The mobile terminal 40 includes a radio unit 41, a voice coding unit 42, a transmitter/receiver 43, a control device 44, and a vibration sensor 45. The control device 44 switches between a normal power saving mode in which all broadcast channels for call arrival are received while in stand-by and a high-degree power saving mode in which broadcast channels for call arrival are received intermittently while in stand-by, based on information from the vibration sensor 45. In addition, a mobile terminal has been proposed, which determines whether or not the reception state of a control channel is good, and which controls the reception interval of the control channels for call arrival in a stand-by state, based on that determination result (Japanese Patent Laid-Open No. Hei 9-261153).

Nevertheless, the conventional mobile terminal controls the control signal reception period with consideration for only the movement state or with consideration for only the reception state. In addition, the control signal reception period is determined without consideration for the communication state of the mobile terminal. Therefore, the control signal reception period may not be appropriately controlled. As a result, the mobile terminal may not sufficiently reduce power consumption or appropriately receive control signals. Furthermore, the conventional mobile terminal controls the control signal reception period only while in stand-by, and does not reduce power consumption while in communication. Accordingly, the power consumption of the mobile terminal may not be sufficiently reduced.

In addition, since the maximum Doppler frequency may not be determined based on only the actual movement speed of the mobile terminal, with a method for controlling reception period based on the maximum Doppler frequency, the control signal reception period may not be appropriately controlled. This is because there are cases where phasing temporally varies according to the movement of surrounding objects and Doppler shift occurs even if the mobile terminal is stationary, therefore preventing correct measurement of the movement state of the mobile terminal. As a result, there are cases where the number of times of receiving broadcast signals is not sufficiently reduced due to the mobile terminal being determined as moving despite actually being stationary. In addition, the mobile terminal must activate the broadcast signal receiver 31 in order to measure the Doppler frequency. As a result, mobile terminals may not reduce power consumption sufficiently.

Furthermore, the control signal for call arrival must be received somewhat frequently in order to prevent lengthening of the time required for call arrival. Accordingly, in the case of controlling the reception interval of the control signal for call arrival, there are restrictions where reception must be performed frequently so as to prevent lengthening of the time required for call arrival. Therefore, there have been cases where power consumption could not be widely reduced.

BRIEF SUMMARY OF THE INVENTION

The objects of the present invention are to reduce power consumption of a mobile terminal, and to provide the mobile terminal, which is able to receive control signals appropriately.

A communication system of the present invention comprises a base station and a mobile terminal. The mobile terminal of the present invention comprises a transmitter/receiver configured to transmit/receive a signal to/from a base station; a communication state determination unit configured to determine a communication state of the transmitter/receiver; a movement state measurement unit configured to measure a movement state of the mobile terminal; and a reception period controller configured to control a reception period for receiving a control signal transmitted from the base station by the transmitter/receiver, based on the communication state determination result determined by the communication state determination unit and the movement state measurement result measured by the movement state measurement unit.

In addition, a control device of the present invention controls the transmitter/receiver that transmits/receives a signal to/from the base station of the mobile terminal. The control device comprises a communication state determination unit configured to determine a communication state of the transmitter/receiver; a movement state measurement unit configured to measure a movement state of the mobile terminal; and a reception period controller configured to control a reception period for receiving a control signal transmitted from the base station by the transmitter/receiver, based on the communication state determination result determined by the communication state determination unit and the movement state measurement result measured by the movement state measurement unit.

According to the communication system, mobile terminal, and control device, the communication state determination unit determines the communication state of the transmitter/receiver. The movement state measurement unit measures the movement state of the mobile terminal. The reception period controller controls the reception period of the control signal based on the communication state determination result and the movement state measurement result. As a result, the mobile terminal and the control device may appropriately control the reception period with consideration for not only the movement state of the mobile terminal but also for the communication state of the mobile terminal as well. Furthermore, the mobile terminal and the control device may also control the reception period while in communication with consideration for the communication state. As a result, the power consumption of the mobile terminal may be reduced, and the mobile terminal may appropriately receive the control signals.

In addition, a communication method of the present invention comprises determining a communication state of the mobile terminal transmitting/receiving a signal to/from a base station; measuring a movement state of the mobile terminal; and controlling a reception period for receiving a control signal transmitted from the base station by the mobile terminal, based on the communication state determination result and the movement state measurement result.

According to the communication method, the reception period of the control signal is controlled based on the communication state and movement state of the mobile terminal. As a result, the reception period for receiving the control signal at the mobile terminal may be appropriately controlled with consideration for not only the movement state of the mobile terminal, but also for the communication state of the mobile terminal as well. Furthermore, the reception period is also controlled while the mobile terminal is in communication with consideration for the communication state of the mobile terminal. As a result, the power consumption of the mobile terminal may be reduced and the mobile terminal may receive control signals appropriately.

BRIEF DESCRIPTION OF THE SEVERAL VIEWS OF THE DRAWINGS

FIG. 7 is a flowchart showing a procedure for a communication method according to the first embodiment of the present invention;

DETAILED DESCRIPTION OF THE INVENTION

First Embodiment (Communication System)

Figure 1:
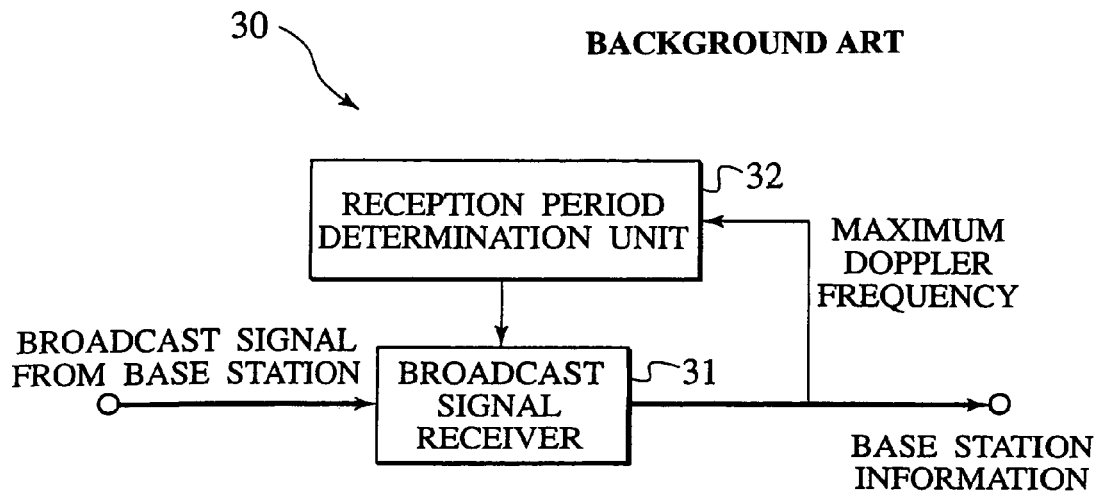
FIG. 1 is a block diagram showing a configuration of a conventional mobile terminal.
Figure 2:
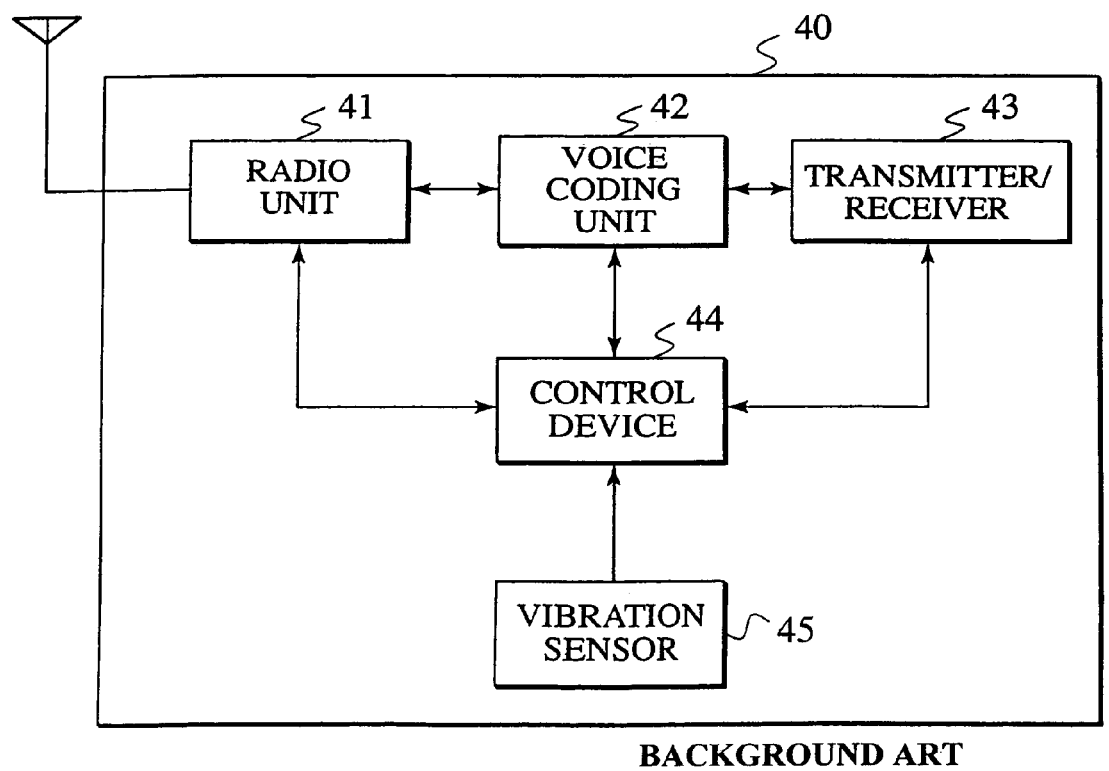
FIG. 2 is a block diagram showing a configuration of another conventional mobile terminal.
Figure 3:
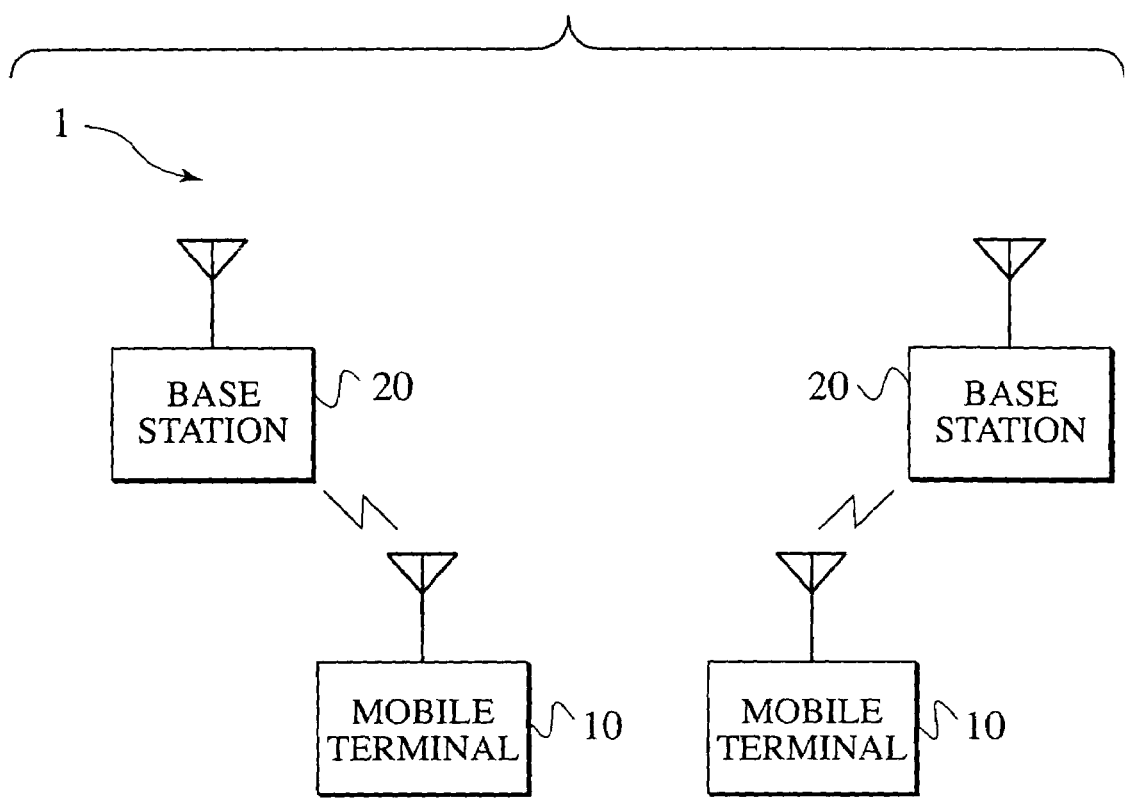
FIG. 3 is a diagram showing a communication system according to a first embodiment of the present invention.

As shown in FIG. 3, a communication system 1 comprises a plurality of mobile terminals 10 and a plurality of base stations 20. The communication system 1 adopts a cellular system. The mobile terminals 10 and the base stations 20 transmit/receive signals. The mobile terminal 10 exists within any cell covered by each base station 20. The mobile terminal 10 finds and connects to a base station 20 that covers the cell in which it exists. More specifically, the base station 20 transmits broadcast signals, which are control signals to be used by the mobile terminal 10 to find the base station 20, and are broadcast to a plurality of mobile terminals 10. The mobile terminal 10 receives the broadcast signals from the base station 20. The mobile terminal 10 finds the closest base station 20 to connect to, based on the received broadcast signals. The mobile terminal 10 finds the base station 20 while in communication or while in stand-by.

Figure 4:
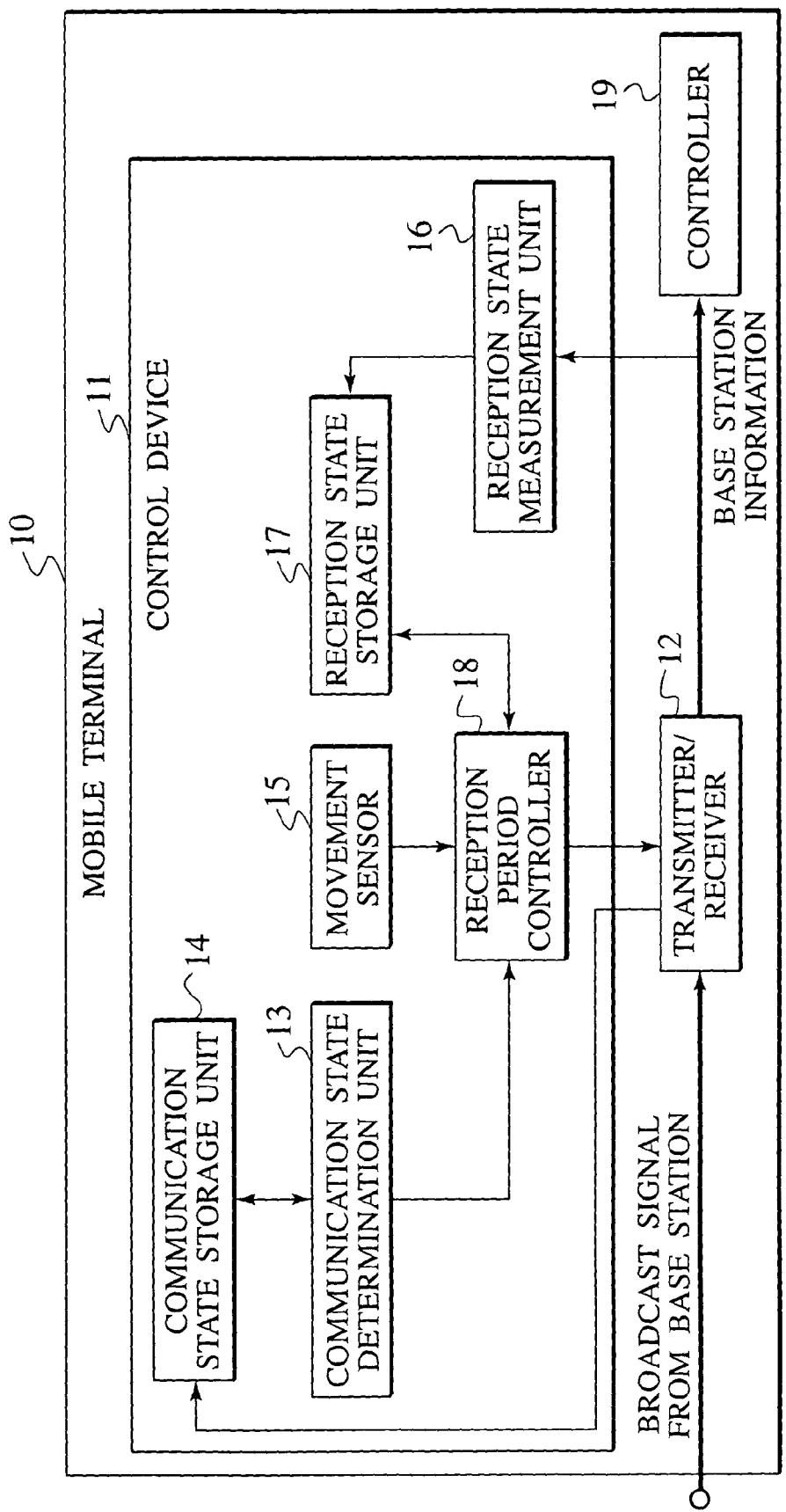
FIG. 4 is a block diagram showing a configuration of a mobile terminal according to the first embodiment of the present invention.

As shown in FIG. 4, the mobile terminal 10 comprises a control device 11, a transmitter/receiver 12, and a controller 19. The control device 11 comprises a communication state determination unit 13, a communication state storage unit 14, a movement sensor 15, a reception state measurement unit 16, a reception state storage unit 17, and a reception period controller 18. The transmitter/receiver 12 transmits/receives signals to/from the base station 20. The transmitter/receiver 12 receives broadcast signals, which are control signals, from the base station 20 according to the control of the control device 11. More specifically, the transmitter/receiver 12 obtains an instruction for the reception period from the reception period controller 18 of the control device 11. The transmitter/receiver 12 receives the broadcast signals by controlling an operation period, which is formed by combining the reception operation and suspension of reception of broadcast signals, according to the instructed reception period. In this manner, the transmitter/receiver 12 receives the broadcast signals from the base station 20 according to the reception period instructed by the reception period controller 18. The transmitter/receiver 12 may adopt a code division multiple access (CDMA) as a radio access.

The transmitter/receiver 12 obtains base station information relating to a base station, which is a transmission source of the broadcast signal, from the reception signal that is the received broadcast signal. The base station information includes base station name or base station number. Accordingly, the mobile terminal 10 may find the closest base station 20 by identifying the base station 20 that has transmitted the broadcast signal based on the base station information. The transmitter/receiver 12 inputs the obtained base station information to the controller 19 that selects and switches the base station to connect to.

The transmitter/receiver 12 also inputs the reception signal that is the received broadcast signal transmitted from the base station 20 to the reception state measurement unit 16 of the control device 11. In addition, the transmitter/receiver 12 records the current communication state in the communication state storage unit 14. The transmitter/receiver 12 updates the communication state recorded in the communication state storage unit 14, when there is change in the communication state. The communication state storage unit 14 stores the communication state of the transmitter/receiver 12. The communication state storage unit 14 stores the communication state recorded by the transmitter/receiver 12.

The control device 11 controls the transmitter/receiver 12. More specifically, the control device 11 controls the control signal reception performed by the transmitter/receiver 12. The communication state determination unit 13 determines the communication state of the transmitter/receiver 12. Communication state refers to the state of communication performed by the transmitter/receiver 12. The communication state includes states such as 'in communication', which is performing data transmission/reception, and 'stand-by', which is waiting for call arrival, for example. The communication state determination unit 13 determines the communication state of the transmitter/receiver 12 by accessing the communication state storage unit 14. The communication state determination unit 13 determines whether the transmitter/receiver 12 is in communication or stand-by, and inputs a signal including the communication state determination result to the reception period controller 18.

The movement sensor 15 is a movement state measurement unit that measures the movement state of the mobile terminal 10. Movement state refers to the state of the movement of the mobile terminal 10 body. The movement state includes, for example, 'stationary', which the mobile terminal 10 is stationary and 'in motion', which the mobile terminal 10 is moving. In addition, the 'in motion' state can be classified into 'in high-speed motion', 'in medium-speed motion', and 'in low-speed motion' based on the moving speed. The information indicative of the movement state includes amount of vibration, amount of impulse, acceleration, and movement speed of the mobile terminal 10 body. The amount of vibration, the amount of impulse, the acceleration, and the movement speed degrease, as the movement speed of the mobile terminal 10 becomes slower. When the mobile terminal 10 is stationary, the amount of vibration, the amount of impulse, the acceleration, and the movement speed are minimal. Meanwhile, the amount of vibration, the amount of impulse, the acceleration, and the movement speed increase, as the movement speed of the mobile terminal 10 becomes faster.

As the movement sensor 15, for example, a vibration sensor which measures the amount of vibration the mobile terminal 10 receives, an impulse sensor which measures the amount of impulse the mobile terminal 10 receives, an acceleration sensor which measures the acceleration of the mobile terminal 10, or a gyroscope which measures the movement speed of the mobile station 10 may be used. In addition, by using a plurality of types of sensors such as the vibration sensor, the impulse sensor, the acceleration sensor, or the gyroscope as the movement sensor 15, a plurality of types of information indicative of the movement state may be measured. The movement sensor 15 inputs a signal including information indicative of the movement state as the movement state measurement result for the mobile terminal 10 to the reception period controller 18.

The reception state measurement unit 16 measures the reception state of a signal from the base station 20 received by the transmitter/receiver 12. The reception signal, which is the broadcast signal received by the transmitter/receiver 12, that is, the control signal from the base station 20, is input to the reception state measurement unit 16 from the transmitter/receiver 12. The reception state measurement unit 16 measures the reception state of the input reception signal. Information indicative of the reception state includes reception power, a signal to interference power ratio (SIR), a carrier to interference power ratio (CIR), and a signal to noise ratio (SN ratio) of the reception signal.

The mobile terminal 10 may grasp the quality of communication with the base station 20 that has transmitted the broadcast signal, from the reception state measurement result. The reception state measurement unit 16 records the information indicative of the reception state as the reception state measurement result in the reception state storage unit 17. When the transmitter/receiver 12 receives a new broadcast signal and a new reception signal is input from the transmitter/receiver 12, the reception state measurement unit 16 measures the reception state of the new reception signal. The reception state measurement unit 16 then updates the information indicative of the reception state in the reception state storage unit 17.

Note that the mobile terminal 10 may concurrently receive broadcast signals from a plurality of base stations 20. In other words, the mobile terminal 10 may receive the broadcast signals not only from the base station 20 which is the transmission source of the reception signal having the best reception state, but also from the surrounding base stations 20 thereof. In this case, a plurality of reception signals that the transmitter/receiver 12 has received the broadcast signals from a plurality of base stations 20 are input to the reception state measurement unit 16 from the transmitter/receiver 12. Accordingly, the reception state measurement unit 16 measures the reception state of the sent plurality of reception signals. The reception state measurement unit 16 then records the reception state of the reception signal having the best reception state in the reception state storage unit 17.

The reception state storage unit 17 stores the reception state measurement result for a signal from the base station 20 received by the transmitter/receiver 12. The reception state storage unit 17 stores information indicative of the reception state to be recorded by the reception state measurement unit 16. In addition, when the transmitter/receiver 12 receives a new broadcast signal, the reception state stored in the reception state storage unit 17 is updated by the reception state measurement unit 16. Accordingly, the reception state storage unit 17 stores the latest reception state of the broadcast signal received in order to find a base station 20.

The reception period controller 18 controls the reception period for receiving the control signal transmitted from the base station 20 by the transmitter/receiver 12, based on the communication state determination result determined by the communication state determination unit 13 and the movement state measurement result measured by the movement sensor 15. Furthermore, the reception period controller 18 preferably controls the reception period, based on the reception state measurement result measured by the reception state measurement unit 16, in addition to the communication state determination result and the movement state measurement result. More specifically, to begin with, a signal including the reception state determination result is input to the reception period controller 18 from the communication state determination unit 13. In addition, a signal including information indicative of the movement state as the movement state measurement result is input to the reception period controller 18 from the movement sensor 15. In addition, the reception period controller 18 obtains information indicative of the latest reception state of the broadcast signal received by the mobile terminal 10 as the reception state measurement result for the signal from the base station 20 received by the transmitter/receiver 12, from the reception state storage unit 17. The reception period controller 18 obtains information indicative of the reception state, from the reception state storage unit 17, when determining the reception period.

Figure 5:
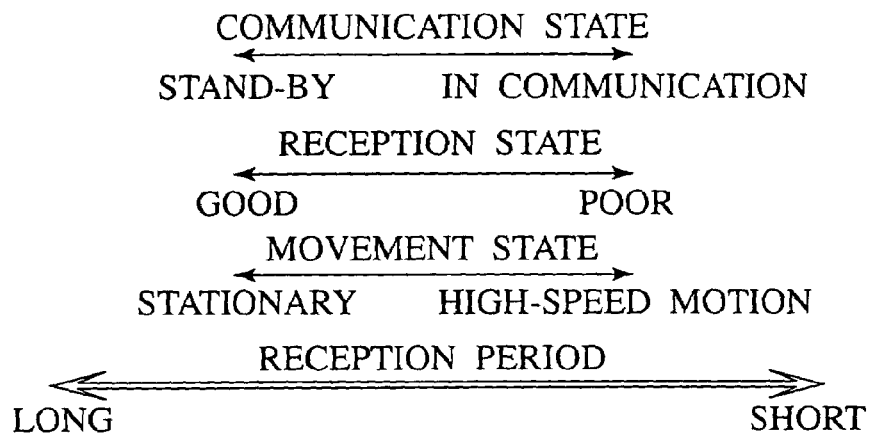
FIG. 5 is a diagram showing a reception period determining criteria according to the first embodiment of the present invention.

The reception period controller 18 then controls the reception period by synthetically determining the communication state, the movement state, and the reception state of the mobile terminal 10, based on the reception period determining criteria shown in FIG. 5. As shown in FIG. 5, the reception period controller 18 lengthens the reception period when the communication state determination result is 'stand-by'. Meanwhile, the reception period controller 18 shortens the reception period when the communication state determination result is 'in communication'. As a result, the mobile terminal 10 may ensure connection with the closest base station 20, and prevent intermittent communication and degradation in communication quality, while in communication. In addition, the mobile terminal 10 may reduce power consumption while in stand-by, since there is no need to frequently find a base station 20 while in stand-by in contrast to while in communication.

Furthermore, as the movement speed becomes slower, such as when the movement state measurement result is 'stationary' or 'in low-speed motion', the reception period controller 18 further lengthens the reception period. Meanwhile, as the movement speed becomes faster, such as when the movement state measurement result is in 'high-speed motion', the reception period controller 18 further shortens the reception period. More specifically, as the amount of vibration, the amount of impulse, the acceleration, or the movement speed, which are information indicative of the movement state, become smaller, the reception period controller 18 further lengthens the reception period. As the amount of vibration, the amount of impulse, the acceleration, or the movement speed become larger, the reception period controller 18 further shortens the reception period.

As a result, the mobile terminal 10 can find a series of connecting base stations 20 to switch to one after another according to the movement, by quickly performing a process for finding the base station 20, while in motion, in particular, while in high-speed motion. In addition, since there is no need to frequently find a base station 20 in contrast to while in motion, because the connecting base station 20 changes infrequently, while in a stationary state or in low-speed motion, the mobile terminal 10 may reduce processing for finding a base station 20 and reduce power consumption while in stationary state or in low-speed motion.

Furthermore, as the reception state measurement result becomes better, the reception period controller 18 further lengthens the reception period. Meanwhile, as the reception state measurement result becomes worse, the reception period controller 18 further shortens the reception period. More specifically, as the reception power, SIR, CIR, or SN ratio, which are information indicative of the reception state become larger, the reception period controller 18 further lengthens the reception period. As the reception power, SIR, CIR, or SN ratio become smaller, the reception period controller 18 further shortens the reception period. As a result, the mobile terminal 10 may appropriately find a base station 20, while the reception state is poor and there is a high possibility of the closest base station 20 changing soon. Meanwhile, the mobile station 10 may reduce power consumption while the reception state is good, since the connecting base station 20 changes infrequently and there is no need to frequently find a base station 20 while the reception state is good, in contrast to the case of a poor communication state.

In this manner, the reception period controller 18 controls the reception period by synthetically determining the communication state, the movement state, and the reception state of the mobile terminal 10. The reception period controller 18 then instructs the transmitter/receiver 12 to receive broadcast signals in the controlled reception period. In other words, the reception period controller 18 inputs a signal including the determined reception period to the transmitter/receiver 12.

Figure 6A:
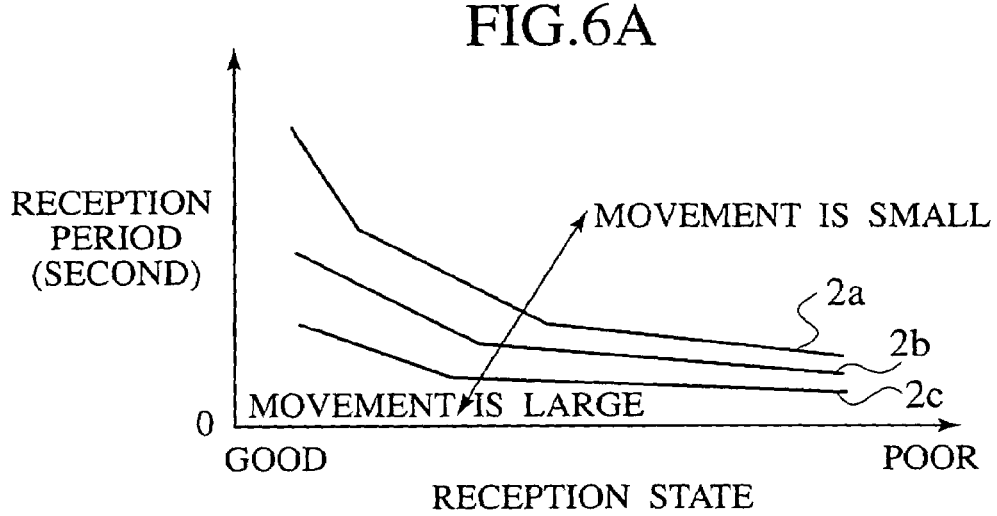
FIGS. 6A and 6B are graphs showing the relationship among reception state, movement state, and reception period according to the first embodiment of the present invention.
Figure 6B:
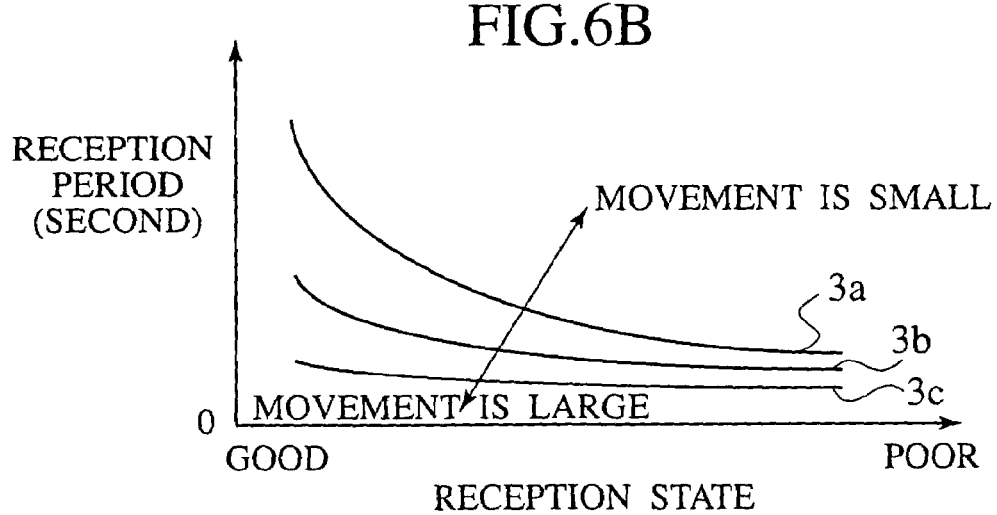

The reception period controller 18 may control the reception period, based on the reception period determining criteria as shown in FIG. 5 as follows, for example. To begin with, the reception period controller 18 determines a provisional reception period, based on the movement state measurement result and the reception state measurement result of the mobile terminal 10, according to the functions shown in FIGS. 6A and 6B. A line graph of FIG. 6A shows a function of the relationship among the reception state, the movement state, and the reception period. A curve graph of FIG. 6B shows a function of the relationship among the reception state, the movement state, and the reception period. In the graphs shown in FIGS. 6A and 6B, the vertical axis represents the reception period with a unit in seconds. The horizontal axis represents the reception state, where the reception state is better further leftward in the graph, and the reception state is worse further rightward in the graph.

The reception period controller 18 selects one of a plurality of lines 2a through 2c or curves 3a through 3c shown in FIGS. 6A and 6B, respectively, based on the movement state measurement result. Regarding the plurality of lines 2a through 2c and curves 3a through 3c, the upper line 2a and the curve 3a indicate that the movement of the mobile terminal 10 is small, that is, the mobile terminal 10 is in the stationary state or the movement speed is slow, and lower line 2c and the curve 3c indicate that the movement of the mobile terminal is large, that is, the movement speed is fast. The reception period controller 18 determines a provisional reception period based on the reception state measurement result, by using the line and curve selected according to the movement state.

The reception period controller 18 then determines a final reception period by multiplying the provisional reception period determined based on the movement state measurement result and the reception state measurement result by a coefficient based on the communication state, or by adding or subtracting a constant based on the communication state. More specifically, the reception period controller 18 multiplies the provisional reception period by a coefficient, which is larger than 1 or adds a constant, when the communication state is 'stand-by'. Meanwhile, the reception period controller 18 multiplies the provisional reception period by a coefficient, which is less than 1 or subtracts a constant when the communication state is 'in communication'.

(Communication Method)

Next, a communication method performed using the mobile terminal 10 is described. As shown in FIG. 7, to begin with, the communication state determination unit 13 determines the communication state of the mobile terminal 10 and inputs the communication state determination result to the reception period controller 18 (S101). In addition, the movement sensor 15 measures the movement state of the mobile terminal 10 and inputs the movement state measurement result to the reception period controller 18 (S102). Furthermore, the reception state measurement unit 16 measures the reception state of the reception signal that is the received broadcast signal, and records the reception state measurement result in the reception state storage unit 17 (S103). The reception period controller 18 obtains the reception state measurement result from the reception state storage unit 17 (S104). These steps (S101), (S102), (S103), and (S104) are performed in parallel.

The reception period controller 18 then determines the reception period based on the communication state determination result, the movement state measurement result, and the reception state measurement result, and inputs a signal including the determined reception period to the transmitter/receiver 12 (S105). The transmitter/receiver 21 receives the broadcast signals according to the input reception period (S106). The mobile terminal 10 then returns to the steps (S101) through (S103), and repeats the steps (S101) through (S106).

According to such mobile terminal 10, control device 11, communication system 1, and communication method, the communication state determination unit 13 determines the communication state of the transmitter/receiver 12. In addition, the movement sensor 15 measures the movement state of the mobile terminal 10. Furthermore, the reception state measurement unit 16 measures the reception state of the signal from the base station 20 received by the transmitter/receiver 12. The reception period controller 18 then controls the reception period of the broadcast signals, which are the control signals, based on the communication state determination result, the movement state measurement result, and the reception state measurement result.

As a result, the mobile terminal 10 may appropriately control the reception period by synthetically considering the movement state, the communication state, and the reception state of the mobile terminal 10. Furthermore, the mobile terminal 10 may also control the reception period with consideration for the communication state depending on the movement state and the reception state while in communication. In addition, the reception period controller 18 may closely control the reception period based on the communication state, the movement state, and the reception state in contrast to the case of switching between two fixed modes as with the conventional case. As a result, the mobile terminal 10 can efficiently thin out the control signal reception operations to sufficiently reduce the power consumption caused by finding the base station 20, and appropriately receive the control signal for finding the base station 20. Accordingly, the mobile terminal 10 may lengthen the stand-by period.

In addition, since the control signal for controlling a reception period is the broadcast signal for finding the base station 20, there is no restriction where reception must be performed at a frequency considering prevention of lengthening the period required for call arrival as with the control signal for call arrival. As a result, it is possible for the reception period controller 18 to lengthen the reception period of the broadcast signals regardless of such restrictions, and is effective in wide reduction of the power consumption.

In addition, the communication state determination unit 13 determines whether the transmitter/receiver 12 is 'in communication' or 'stand-by' as the communication state. As a result, the reception period controller 18 may further appropriately control the reception period based on whether the mobile terminal 10 is in communication or stand-by.

Furthermore, the movement sensor 15 measures at least one of the amount of vibration, amount of impulse, acceleration, or movement speed of the mobile terminal 10, which are used for accurately determining the movement state, as the movement state. As a result, the mobile terminal 10 may accurately grasp the movement state of the mobile terminal 10. Accordingly, the reception period controller 18 may appropriately control the reception period of the control signals by using the accurate movement state measurement result. Furthermore, since there is no need to activate the transmitter/receiver in order to measure the movement state as with the case of measuring the Doppler frequency, the power consumption may be further suppressed. As a result, the mobile terminal 10 may further reduce the power consumption.

Second Embodiment (Communication System)

In this embodiment, the reception state measurement unit 16 of the mobile terminal 10 shown in FIG. 4 measures the difference in reception states of the signals from a plurality of base stations 20 received by the transmitter/receiver 12, as the reception state. The mobile terminal 10 may concurrently receive the broadcast signals from a plurality of base stations.

Figure 8A:
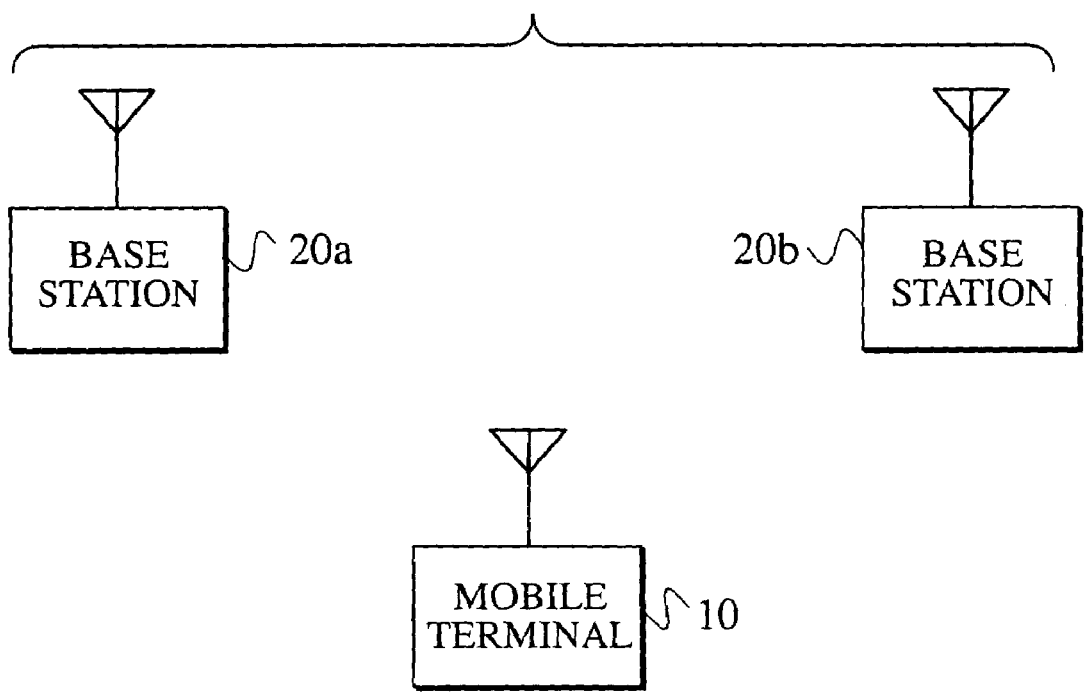
FIGS. 8A and 8B are diagrams showing the positional relationship between a mobile terminal and a base station according to a second embodiment of the present invention.
Figure 8B:
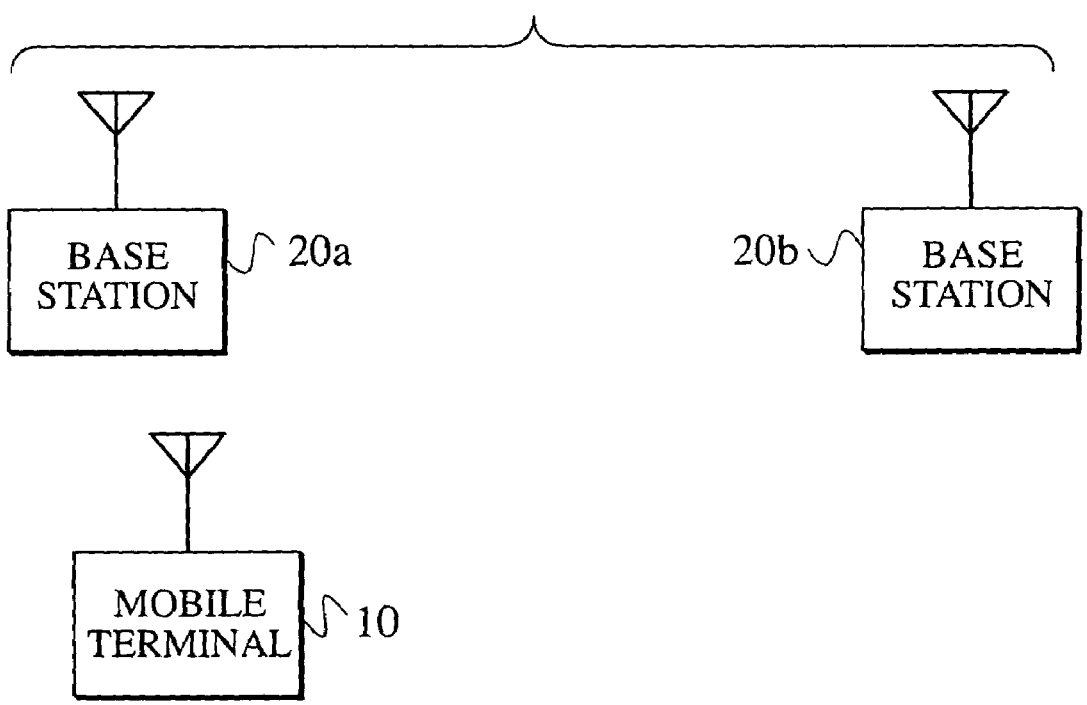

As shown in FIGS. 8A and 8B, the case where a mobile terminal 10 receives broadcast signals from both a base station 20*a* and a base station 20*b* is described as an example. In this case, a reception signal that is the broadcast signal from the base station 20*a* received by the transmitter/receiver 12, and a reception signal that is the broadcast signal from the base station 20*b* received by the transmitter/receiver 12 are input to the reception state measurement unit, 16 from the transmitter/receiver 12. The reception state measurement unit 16 measures the difference in reception states of the two input reception signals. More specifically, the reception state measurement unit 16 measures information indicative of the reception states of the two reception signals, such as the reception power, SIR, CIR, or SN ratio, and finds the difference between them.

As shown in FIG. 8A, when the mobile terminal 10 exists at about the midpoint between the two mobile stations 20*a* and 20*b*, the reception state of the broadcast signal from the base station 20*a* is almost same as that of the broadcast signal from the base station 20*b*. As a result, the difference in reception states of the broadcast signals from the base station 20*a* and the broadcast signals from the base station 20*b* becomes small. Meanwhile, as shown in FIG. 8B, when the mobile terminal 10 exists at a position closer to the base station 20*a* than to the other base station 20*b,* the reception state of the broadcast signals from the base station 20*a* becomes better than the reception state of the broadcast signals from the base station 20*b*. As a result, the difference in reception states of the broadcast signals from the base station 20*a* and the broadcast signals from the base station 20*b* becomes large. Note that the reception state measurement unit 16 measures, for example, the difference between the reception states of the reception signal having the best reception state and the reception state of the reception signal having the next best reception state, in the case of receiving the broadcast signals from three or more base stations 20.

The reception state measurement unit 16 records the difference in reception states of the signals from a plurality of base stations 20 received by the transmitter/receiver 12 as the reception state measurement result in the reception state storing unit 17. The reception state storage unit 17 stores the difference in reception states of the broadcast signals from the plurality of base stations 20 input by the reception state measurement unit 16.

The reception period controller 18 controls the reception period using the difference in reception states of the broadcast signals from the plurality of base stations 20 received by the transmitter/receiver 12 as the reception state measurement result. More specifically, the reception period controller 18 obtains from the reception state storage unit 17 the difference in reception states of the broadcast signals from the plurality of base stations 20 received by the transmitter/receiver 12 as the reception state measurement result. The reception period controller 18 then controls the reception period synthetically determining the communication state, the movement state, and the reception state of the mobile terminal 10, based on the reception period determining criteria shown in FIG. 9.

Figure 9:
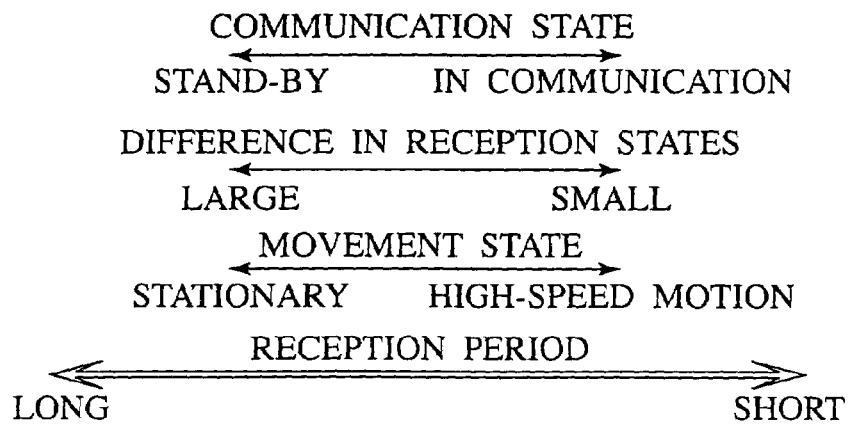
FIG. 9 is a diagram showing a reception period determining criteria according to the second embodiment of the present invention.

The criteria of the communication state determination result and the movement state measurement result shown in FIG. 9 are similar to the reception period determining criteria shown in FIG. 5. As the difference in reception states becomes larger, the reception period controller 18 further lengthens the reception period. Meanwhile, as the difference in reception states becomes smaller, the reception period controller 18 further shortens the reception period. More specifically, as the difference in the reception power, SIR, CIR, or SN ratio, which are information indicative of the reception states of the broadcast signals from a plurality of base stations becomes larger, the reception period controller 18 further lengthens the reception period. As the difference in the reception power, SIR, CIR, or SN ratio becomes smaller, the reception period controller 18 further shortens the reception period.

As a result, the mobile terminal 10 may appropriately find a base station 20 when the difference in reception states is small, the mobile terminal exists at about the midpoint between the base station 20*a* and the base station 20*b* as shown in FIG. 8A, and there is a high possibility of the closest base station changing soon. Meanwhile, when the difference in reception states is large, and the mobile terminal 10 exists at a position closer to the base station 20*a* than to the base station 20*b* as shown in FIG. 8B, the mobile terminal 10 may reduce power consumption, since there is no need to frequently find the base station 20 in contrast to the case where the difference in reception states is small, because the connecting base station changes infrequently.

(Communication Method)

Figure 10:
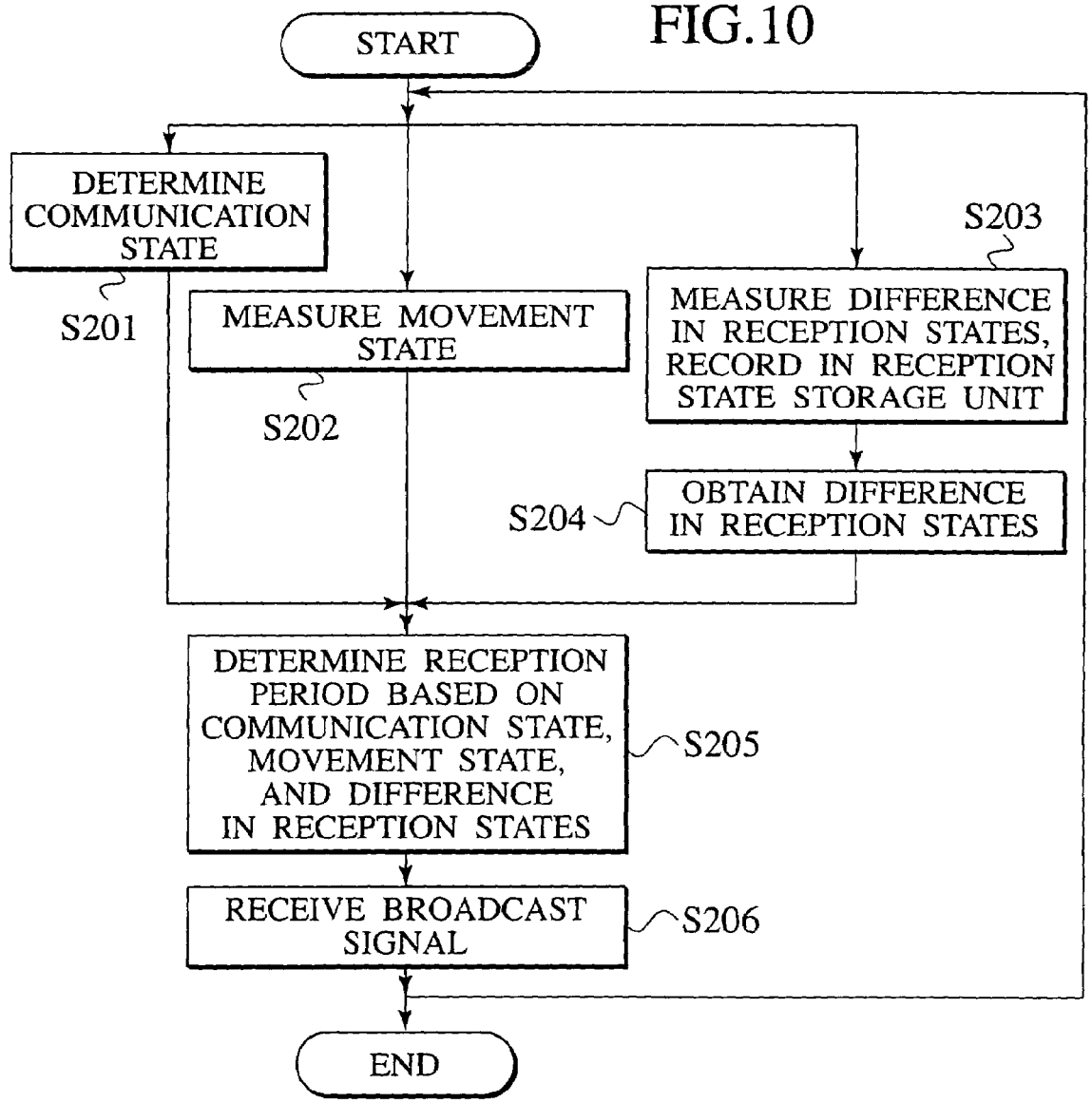
FIG. 10 is a flowchart showing a procedure for a communication method according to the second embodiment of the present invention.

Next, a communication method performed using the mobile terminal 10 is described. As shown in FIG. 10, to begin with, the mobile terminal 10 performs steps (S201) and (S202). The steps (S201) and (S202) are similar to the steps (S101) and (S102) shown in FIG. 7. In addition, the reception state measurement unit 16 measures the difference in reception states of the reception signals that is the received broadcast signals from a plurality of base stations 20, and records the reception state measurement result in the reception state storage unit 17 (S203). The reception period controller 18 obtains the difference in reception states from the reception state storage unit 17 as the reception state measurement result (S204). These steps (S201), (S202), (S203), and (S204) are performed in parallel.

The reception period controller 18 then determines the reception period, based on the communication state determination result, the movement state measurement result, and the difference in reception states, and inputs a signal including the determined reception period to the transmitter/receiver 12 (S205). The transmitter/receiver 12 receives the broadcast signals according to the input reception period (S206). The mobile terminal 10 returns to the steps (S201) through (S203), and repeats the steps (S201) through (S206).

According to the mobile terminal 10, control device 11, communication system 1, and communication method, the following effects can be obtained in addition to the effects obtained with the first embodiment. The reception state measurement unit 16 measures as the reception state the difference in reception states of the signals from a plurality of base stations 20 received by the transmitter/receiver 12. As a result, the reception period controller 18 may appropriately control the reception period with consideration for the positional relationship of the mobile terminal 10 to the plurality of base stations, based on the difference in reception states. Accordingly, the mobile terminal 10 may sufficiently reduce the power consumption due to finding the base station, and may appropriately receive control signal for finding the base station. Accordingly, the mobile terminal 10 may lengthen the stand-by period.

MODIFIED EXAMPLE

The present invention is not limited to the above-mentioned first and second embodiments, and various modifications are possible. The mobile terminal 10 performs communication through connection with the closest base station 20 as described above. In addition to the base station, which connects and performs data transmission/reception, that is, performs communication (hereafter, referred to as "the communicating base station"), the mobile terminal 10 may receive broadcast signals from base stations which exist surrounding the communicating base station (hereafter, referred to as "the surrounding base stations"), and find whether or not there is a closer base station while in communication. In other words, the broadcast signals to be received by the mobile terminal 10 include broadcast signals from the communicating base station and broadcast signals from the surrounding base stations. As a result, the reception period controller 18 may control the reception period of the broadcast signals from the communicating base station and the reception period of the broadcast signals from the surrounding base stations separately. In this case, the reception state measurement unit 16 records both the reception state measurement result of the broadcast signals from the communicating base station and the reception state measurement result of the broadcast signals from the surrounding base stations in the reception state storage unit 17.

For example, in the case where the movement state measurement result is 'stationary' or 'slow-speed motion", the reception period controller 18 further lengthens the reception period of the broadcast signals from the surrounding base stations to be longer than the reception period of the broadcast signals from the communicating base station. In particular, in the case where the movement state measurement result is 'stationary', the reception period controller 18 may abort reception of the broadcast signals from the surrounding base stations, or set a reception period long enough to be equivalent to an abort. When the moving speed becomes faster, or the reception state of the broadcast signals from the communicating base station worsens, the reception period controller 18 controls so as to resume the reception of the broadcast signals from the surrounding base stations or so as to shorten the reception period.

Note that when the reception period controller 18 controls the reception period of the broadcast signals from the communicating base station and the reception period of the broadcast signals from the surrounding base stations separately, the two kinds of functions shown in FIGS. 6A and 6B including those relating to the reception period for the communicating base station and those relating to the reception period for the surrounding base stations may be prepared so as to determine provisional reception periods according to the respective functions. In this case, a reception period determined by a function relating to the reception period for the surrounding base stations is set to be longer than a reception period determined by a function relating to the reception period for the communicating base station. Therefore, the power consumption required for receiving the broadcast signals from the surrounding base stations may be further reduced and the power consumption of the entire mobile terminal 10 may be even further reduced.

What is claimed is:

1. A mobile terminal, comprising:
   a transmitter/receiver configured to transmit/receive a signal to/from a base station;
   a reception state measurement unit configured to measure a reception state of the signal from the base station received by the transmitter/receiver;
   a movement state measurement unit configured to measure a movement state of the mobile terminal; and
   a reception period controller configured to control reception periods for receiving a control signal transmitted from the base station by the transmitter/receiver, based on a reception state measurement result determined by the reception state measurement unit and a movement state measurement result measured by the movement state measurement unit, by performing a first and second control process, wherein
   when the movement state is a low-speed state, the first control process shortens a low-speed reception period as the reception state degrades,
   when the movement state is a high-speed state, the second control process shortens a high-speed reception period as the reception state degrades, and
   when the reception state is constant, the high-speed reception period is shorter than the low-speed reception period.

2. The mobile terminal of claim 1, further comprising:
   a communication state determination unit configured to determine whether the transmitter/receiver is in communication or stand-by, as a communication state wherein,
   the reception period controller controls the reception period based on the reception state measurement result, the movement state measurement result, and a communication state determination result determined by the communication state determination unit.

3. The mobile terminal of claim 1, wherein the reception state measurement unit measures a difference in reception states of signals from a plurality of base stations received by the transmitter/receiver, as the reception state.

4. The mobile terminal of claim 1, wherein said reception state comprises one of a reception power, a signal to interference power ratio, a carrier to interference power ratio, and a signal to noise ratio of the signal.

5. A control device, comprising:
   a reception state measurement unit configured to measure a reception state of the signal from a base station received by a mobile terminal;
   a movement state measurement unit configured to measure a movement state of the mobile terminal; and
   a reception period controller configured to control a reception period for receiving a control signal transmitted from the base station by the mobile terminal, based on a reception state measurement result determined by the reception state measurement unit and a movement state measurement result measured by the movement state measurement unit, by performing a first and second control process, wherein
   when the movement state is a low-speed state, the first control process shortens a low-speed reception period as the reception state degrades,
   when the movement state is a high-speed state, the second control process shortens a high-speed reception period as the reception state degrades, and
   when the reception state is constant, the high-speed reception period is shorter than the low-speed reception period.

6. The control device of claim 5, further comprising:
   a communication state determination unit configured to determine whether the transmitter/receiver is in a communication state or stand-by state, wherein
   the reception period controller controls the reception period based on the reception state measurement result, the movement state measurement result, and a communication state determination result determined by the communication state determination unit.

7. A communication system, comprising:
   a base station; and
   a mobile terminal comprising: a transmitter/receiver configured to transmit/receive a signal to/from the base station;
   a reception state measurement unit configured to measure a reception state of the signal from the base station received by the transmitter/receiver;
   a movement state measurement unit configured to measure a movement state of the mobile terminal; and
   a reception period controller configured to control a reception period for receiving a control signal transmitted from the base station by the transmitter/receiver, based on a reception state measurement result determined by the reception state measurement unit and a movement state measurement result measured by the movement state measurement unit, by performing a first and second control process, wherein
   when the movement state is a low-speed state, the first control process shortens a low-speed reception period as the reception state degrades,
   when the movement state is a high-speed state, the second control process shortens a high-speed reception period as the reception state degrades, and
   when the reception state is constant, the high-speed reception period is shorter than the low-speed reception period.

8. A communication method, comprising:
   receiving a signal from a base station;
   measuring a reception state of the signal from the base station;

measuring a movement state of the mobile terminal; and
controlling a reception period for receiving a control signal transmitted from the base station by the mobile terminal, based on a reception state measurement result and a movement state measurement result, by performing a first and second control process, wherein
when the movement state is a low-speed state, the first control process shortens a low-speed reception period as the reception state degrades,
when the movement state is a high-speed state, the second control process shortens a high-speed reception period as the reception state degrades, and
when the reception state is constant, the high-speed reception period is shorter than the low-speed reception period.

* * * * *